United States Patent [19]

Stubbings

[11] 4,050,336

[45] Sept. 27, 1977

[54] INSULATION CUTTER

[75] Inventor: James H. Stubbings, Rockville, Md.

[73] Assignee: Potomac Applied Mechanics, Inc., Bethesda, Md.

[21] Appl. No.: 664,173

[22] Filed: Mar. 5, 1976

[51] Int. Cl.[2] .......... B23D 19/00; B26D 1/18

[52] U.S. Cl. .......... 83/486.1; 83/490; 30/300; 30/310

[58] Field of Search .......... 83/490, 485, 486, 486.1, 83/487; 30/300, 310

[56] References Cited

U.S. PATENT DOCUMENTS

| | | | |
|---|---|---|---|
| 1,519,815 | 12/1924 | Vance | 83/490 |
| 3,302,669 | 2/1967 | Edler | 83/486.1 X |

FOREIGN PATENT DOCUMENTS

| | | | |
|---|---|---|---|
| 302,035 | 12/1916 | Germany | 83/490 |

*Primary Examiner*—Willie G. Abercrombie

*Attorney, Agent, or Firm*—Cushman, Darby & Cushman

[57] ABSTRACT

Apparatus for cutting pieces of insulation used to line specially-shaped ductwork, such as radius elbows and O. G. sets. A pair of telescoping trammel tubes are pivotal about a pivot post, and radially movable with respect to the post to assume any desired, graduated, relative position. A cutter wheel is disposed on the end of each of the trammel tubes, and the cutter wheels may be movable from one position wherein they are in line with the trammel tubes, and thus can make a radial cut, to a second position wherein they are disposed substantially 90° with respect to the trammel tubes, and thus can make an arcuate cut with the pivot post generally at the center of the arc. The tubes can be manipulated with respect to the pivot post and with respect to each other, and the cutter wheels may be manipulated with respect to the tubes, so that both radial and true arcuate cuts can be made in insulation to produce an insulation piece of the desired dimensions quickly and accurately.

7 Claims, 5 Drawing Figures

INSULATION CUTTER

BACKGROUND AND SUMMARY OF THE INVENTION

The invention relates to apparatus for cutting insulation or like sheet material, especially for lining ductwork, such as radius elbows and O.G. sets. At the present time, such insulation is conventionally cut by hand, a great deal of time and effort being necessary for an individual doing the cutting to set up the proper arcs that are to be cut, making sure that the right radius is cut, etc. Also, it is difficult to cut with a great deal of precision when making the arcuate cuts, so the end product may not have an exact fit on the ductwork to which it is to be connected. According to the present invention, these problems are avoided by providing a simple mechanical system for quickly setting up and changing the patterns to be cut, and positively guiding the arcs and radial cuts that are to be made.

While there are many prior art cutters that per se are adaptable for making two arcuate concentric cuts at the same time (see, for example, U.S. Pat. Nos. 1,841,099, 1,389,765, and 2,677,887), none of these prior cutters are adaptable for the quick set-ups and cuts that are necessary according to the present invention, nor do any of them provide cutting means that are particularly effective for cutting insulation, as is possible according to the present invention. According to the present invention, apparatus is provided that includes a pivot post, a first trammel tube, a second trammel tube telescopically movable with respect to the first trammel tube, means for mounting the first trammel tube for radial movement with respect to the pivot post, means for retaining the first trammel tube in one of a plurality of radial positions with respect to the pivot post, means for retaining the second trammel tube in one of a plurality of radial positions with respect to the first trammel tube, a first cutter wheel disposed on the bottom of the first trammel tube, and a second cutter wheel disposed on the bottom of the second trammel tube. The cutter wheels may be disposed in a first position in line with the tubes whereby radial cuts may be made therewith, or in a second position disposed 90° with respect to the first position so that arcuate cuts may be made therewith with the pivot post generally at the center of the arcs being cut. With the trammel tubes in proper relative position, and the cutter wheels in arcuate cutting position, the apparatus is pivoted about the pivot post, and even, true cuts are made in the insulation with a minimum of skill required by the user of the apparatus.

It is the primary object of the present invention to provide apparatus that allows the quick and efficient cutting of insulation or like sheet material for lining specially ductwork and the like. This and other objects of the invention will become clear from an inspection of the detailed description of the invention, and from the appended claims.

DETAILED DESCRIPTION OF THE INVENTION

Figure 1:
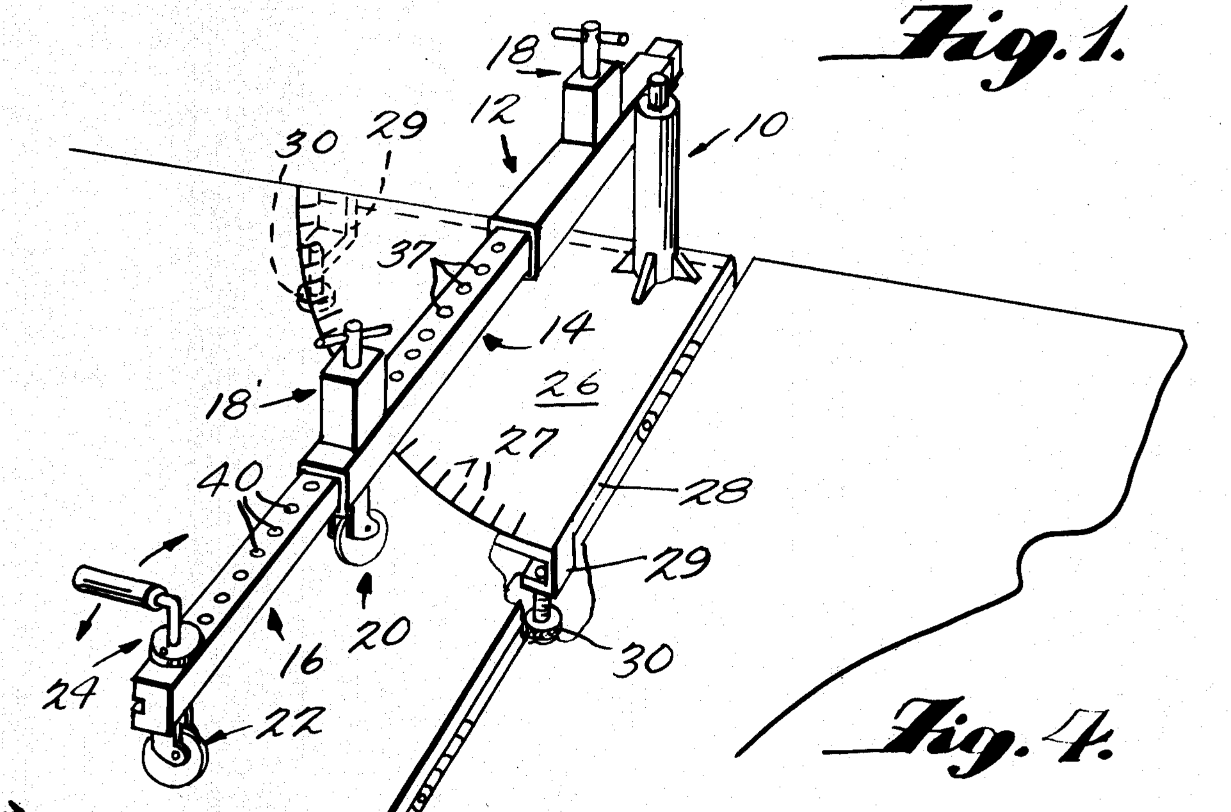
FIG. 1 is a schematic perspective view of exemplary insulation cutting apparatus according to the present invention in cooperation with a table on which insulation is to be cut.

An exemplary cutting apparatus according to the present invention is shown schematically in perspective in FIG. 1. The apparatus includes several major components, including a pivot post 10, a first trammel tube 14, a second trammel tube 16 telescopically mounted with respect to the first trammel tube 14, means 12 for mounting the first trammel tube 14 for radial movement with respect to the pivot post 10, means 18 for retaining the first trammel tube 14 in any one of a plurality of radial positions with respect to the pivot post 10, means 18' for retaining the second trammel tube 16 in any one of a plurality of radial positions with respect to the first trammel tube 14, a first cutter wheel assembly 20 mounted on the first trammel tube 14 on a portion thereof remote from the pivot post 10, and a second cutter wheel assembly 22 mounted on the second trammel tube 16 on a portion thereof remote from the first trammel tube 14. A means 24 is provided for moving the second cutter wheel 22 between a first position wherein it is in line with the tube 16 and when the tube 16 is moved radially will make a radial cut in insulation or the like on table A, and a second position wherein it is disposed at 90° with respect to the tube 16, and when the tube 16 is pivoted about the pivot post 10 makes an arcuate cut in insulation or the like on table A with the pivot post 10 generally at the center of a circle of which the arc is a part.

The pivot post 10 comprises an upstanding member that may fit in a preformed opening in a table 10 on which the cutting of insulation or the like is to take place. In order to assist the user of the apparatus in laying out the proper angles for cuts, etc., a piece of sheet metal 26 may be utilized with the apparatus, mounted on the table A, and having arcuate division lines 27 thereon. The sheet 26 essentially functions as a protractor. The sheet 26 may be detachable from the table A, having edge portions 28 thereof that overlap the edges of the Table A, and having bracket portions 29 thereof, with screws 30, that allow the sheet 26 to be fixed to the table A. An opening (not shown) may be provided in sheet 26 to receive the post 10 therein. When a hinged table A is used, as shown in the drawings, a sheet 26 may be disposed on either side of hinged portion B of the table A.

Figure 2:
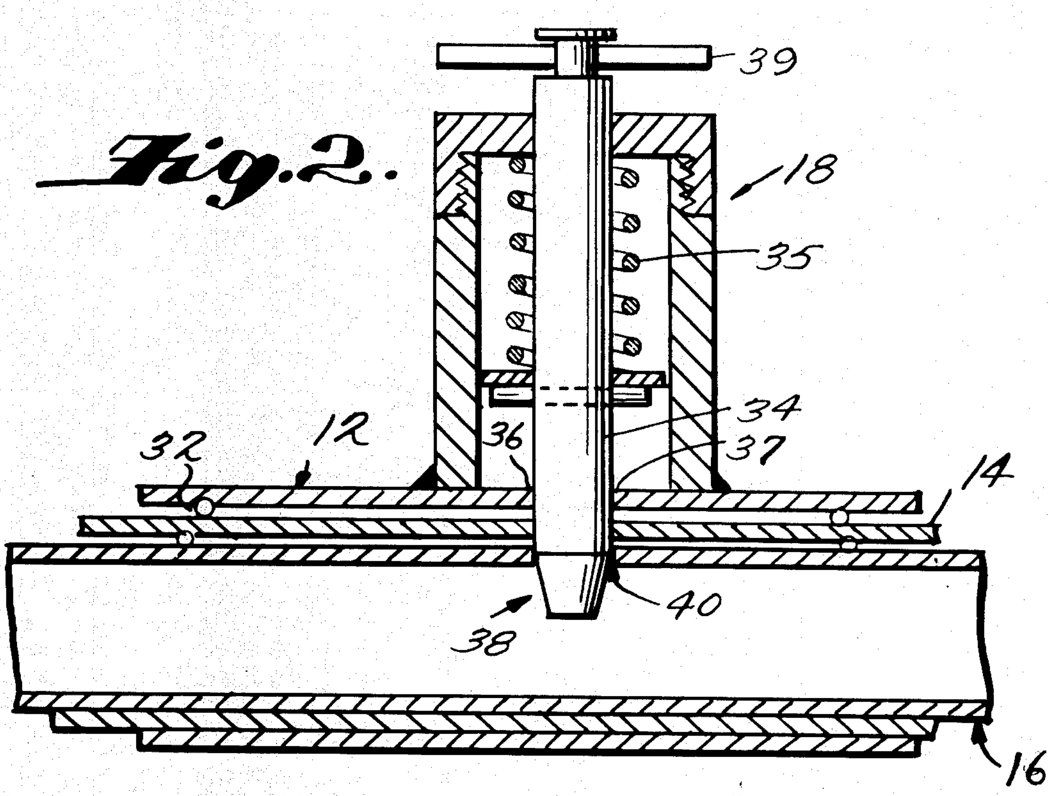
FIG. 2 is a detail cross sectional view showing an exemplary retaining means according to the present invention in cooperation with telescoping trammel tube.

Securely mounted to the pivot post 10 is a means 12 for mounting the first trammel tube 14 for radial movement with respect to the post 10. The means 12, as shown in the drawings, may comprise a tubular section having portions thereof cooperating with machines portions on the trammel tube 14 to allow radial movement — but only radial movement — of the tube 14 with respect to the post 10. It is noted that the means 12 is mounted off-center with respect to the axis of the post 10. While such an arrangement allows freer access to all the component parts of the apparatus, it is to be understood that such an arrangement is merely optional, and that the means 12 could be mounted so that it was concentric with the center of the post 10 if desired. As shown in more detail in FIG. 2, the means 12 has sleeve bearings 32 associated therewith to allow for completely free sliding of the tube 14 with respect to the means 12.

The means 18 for retaining the tube 14 in one of a plurality of radial positions to which it is moved with respect to the post 10 includes (see FIG. 2) a plunger 34 that is spring-biased by spring 35 into cooperation with an opening 36 formed in means 12, and into one of a plurality of openings 37 formed along the length of the tube 14. (Note that in FIG. 2 the plunger 34 also cooperates with the second trammel tube 16, the second tube 16 being shown in a retracted position thereof in FIG. 2). The retaining end 38 of the plunger 34 may have a 15° taper to facilitate entry thereof into the openings 37, and to cam the tube 14 into exact position relative to means 12 by engaging the edges forming the opening 37. A handle 39 may be provided on the accessible end of the plunger 34 to allow lifting thereof against the spring bias so that the tube 14 can be linearly moved with respect to the means 12. Preferably, openings 37 may be formed every ½ inch along the length of the tube 14, and each opening may have indicia associated therewith that gives the distance of the tube from some reference point. Advantageously, the indicia may read ½ inch higher than the real distance of a given opening from a reference point since insulation is conventionally cut ½ inch less than the O.G. set or radius elbow in which it is to be used. In that way, the user of the apparatus according to the invention could merely set the tube 14 at the dimension desired for the radius elbow itself, and the correction would automatically be made for cutting the insulation piece ½ inch less than the radius elbow or the like. The means 18' may be substantially identical to the means 18, including a spring-biased plunger and the like, and openings 40 may be formed in the tube 16 spaced a certain amount from each other opening 40, the openings 40 preferably being spaced the same distance from each other as the openings 39 in the tube 14, and again indicia being formed thereon corresponding to the indicia on tube 14.

Figure 3B:
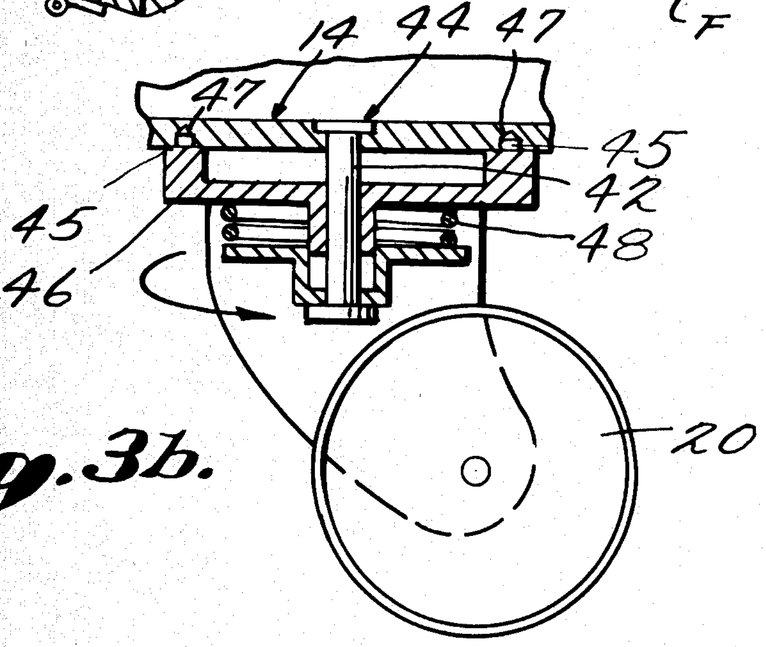
FIG. 3*b* is a detail view partly in cross-section and partly in elevation of a first cutter wheel mounting assembly according to the present invention.

The first cutter wheel 20 is mounted adjacent the end of the tube 14 normally most remote from the pivot 10. The wheel is rotatable on ball bearings or the like during cutting, and the entire periphery thereof is sharpened. The wheel 20 would normally be disposed at a position substantially 90° with respect to the direction of elongation of the tube 14, so that as the tube 14 was pivoted about the post 10, an arcuate cut was made in insulation or the like disposed on the table A with the post 10 being generally at the center of the arc (the post is referred to only as generally at the center of the arc since in the preferred embodiment of the invention shown in the drawings the means 12 offset from the axis through the post 10, and thus the post 10 is not exactly at the center of the arc). It is desirable that the wheel 20 be movable to a position in line with the tube 14, however, so that during radial movement of the tube 14 the wheel 20 will roll and not be dragged along the table A or insulation or the like disposed thereon (and so that the wheel 20 may make a radial cut during this radial movement). FIG. 3*b* shows one of many alternative forms the means for mounting the wheel 20 could take that would allow movement thereof between an in-line and a 90° position with respect to the tube 14. As shown in FIG. 3*b*, a shaft 42 is provided, establishing a vertical axis about which the wheel 20 is rotatable, the shaft being mounted in a bearing 44 formed on the bottom of the tube 14. One or more pegs 45 are formed on a support 46 for the wheel 20, whigh pegs 45 are generally on the circumference of a circle with its center at the axis established by shaft 42. These pegs 45 cooperate with corresponding openings 47 formed in the bottom of the tube 14. The pegs 45 and support 46 may be spring-biased, as by spring 48, or other suitable structure can be provided, so that the support 46 may be rotated with respect to the tube 14 from one position wherein pegs 45 engage openings 47, to another position 90° with respect to the first position. The only requirement for the structure of FIG. 3*b* is that it not interfere with the free sliding of the tube 16 in the tube 14.

Figure 3A:
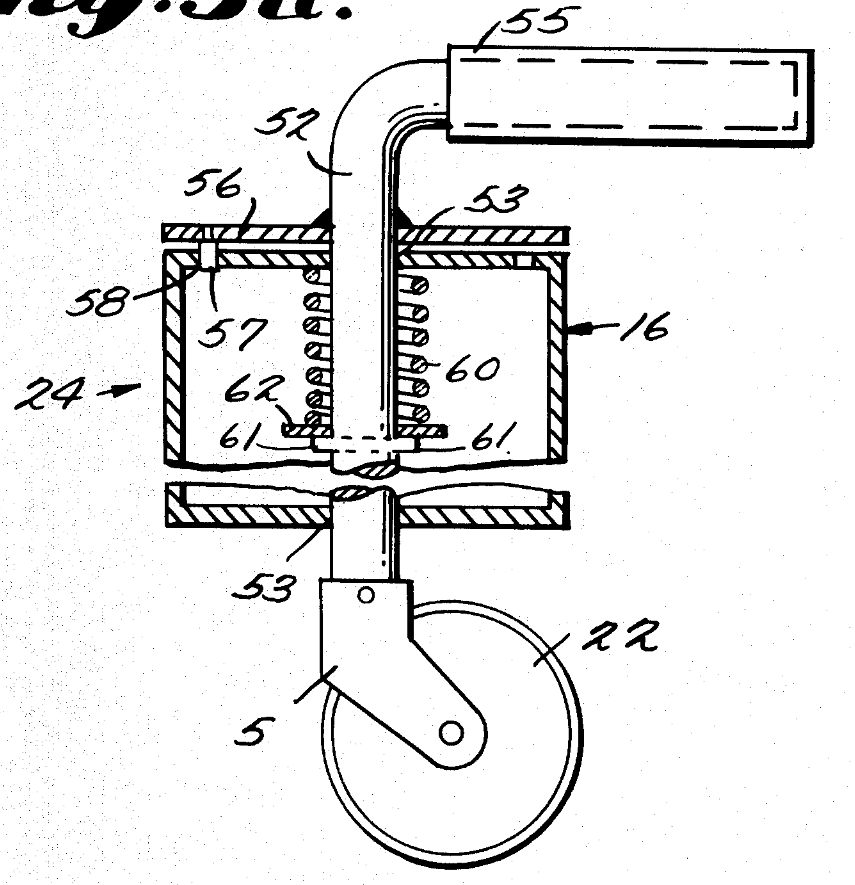
FIG. 3*a* is a detail view partly in elevation and partly in cross-section of a second cutter wheel mounting assembly according to the present invention.

The second cutter wheel 22, as shown in detail in FIG. 3*a*, is mounted through ball bearing mounting means 50 to a pair of ears 51 extending downwardly from a rod member 52 extending through the tube 16. Both cutter wheels 20, 22 may be made of KETOSE to facilitate cutting of conventional insulation. The rod member 52 passes through bushings 53 formed on the top and bottom of the tube 16, and has a handle 55 and a detent plate 56 formed on the portion thereof extending above the tube 16. The plate 56 may have a peg 57 or the like depending therefrom, which peg 57 cooperates with either one of several openings 58 that are formed on the top of the tube 16. The openings 58 are spaced 90° from each other, and at least two are provided so that the wheel 22 may be retained in a first position wherein it is in line with the tube 16, to a second position wherein it is disposed at 90° with respect to the first position, and wherein it can make an arcuate cut in insulation or the like disposed on the table A, the post 10 being generally at the center of the arc so formed. To move the wheel 22 from one position thereof to another position, the handle 55 is pulled upwardly, and the rod member 52 with the wheel 22 mounted on one end thereof, is moved vertically against the bias of spring 60 which tends to bias the rod 52 downwardly so that the wheel 22 is in engagement with table A by acting on pegs 61 extending from rod member 52, through plate 62. The wheel 22 is lifted off the table A and out of engagement with an insulation or the like thereon when the handle 55 is moved upwardly. Rotation of the rod member 52 moves the peg 57 from cooperation with one opening 58 to cooperation with another opening 58.

Figure 4:
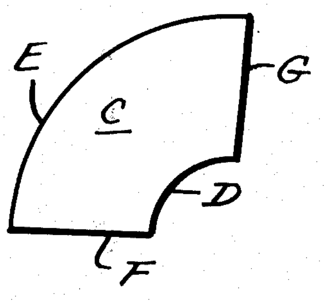
FIG. 4 is a diagrammatic cive of an exemplary piece of insulation that may be cut according to the present invention.

Exemplary apparatus according to the present invention having been set forth, an exemplary operation of the apparatus will now be described. When it is desired to cut insulation or the like for an O.G. set or a radius elbow, a sheet 26 having arcuate markings 27 thereon is mounted on a table A. A post 10 having a sleeve 12 or the like associated therewith is then passed through an opening in the sheet 26 into a corresponding opening in the table A, the post 10 being rotatable with respect to the table A. A first trammel tube 14 is placed in cooperative telescoping engagement with the sleeve 12, and a second trammel tube 16 is placed in cooperative telescoping engagement with the tube 14. With the ends of the tubes 14 and 16 as close to the sleeve 12 as possible, and with the wheels 20 and 22 aligned with the tubes 14 and 16 respectively, the means 18, 18' are released, and the tube 14 is removed radially with respect to the post 10, and the tube 16 is moved radially with respect to the tube 14, until a desired position is reached, as indicated by indicia on the tubes 14, 16. If insulation or the like is disposed on the table A when the tubes 14, 16 are moved radially, a radial cut will be made in the insulation. When the desired relative positions of the wheels 20, 22 are reached, the handle 55 is pulled upwardly, and the wheel 22 is rotated to a 90° position with respect to the tube 16, the peg 57 cooperating with a hole 58 formed in the tube 16, and the wheel 20 is rotated so that pegs 45 engage openings 47 which dispose the wheel 20 at a 90° position with respect to the tube 14. Grasping a hold of the handle 55, the insulation or the like which is disposed on the table A is cut by pivoting the tubes 14, 16 with respect to the table A about the post 10. When the desired arc has been cut, the wheels 20, 22 are again moved to their in-line positions, the plunger associated with means 18' is moved upwardly and the tube 16 is moved radially inwardly, and the plunger associated with the means 18 is moved upwardly and the tube 14 is moved radially inwardly, the wheels 20, 22 cutting the insulation during their radial movement. The final piece of insulation that is cut is shown generally at C in FIG. 4, the edges D and E thereof having been cut respectively by the wheels 20, 22 during arcuate movement thereof, and the edges F and G thereof having been cut by the wheel 22 during radial movement thereof. If the edge F is already formed in the insulation before cutting, the wheel 22 may be moved out of engagement with the insulation C during radial movement thereof along the line of edge F.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. Apparatus for cutting insulation sheet material or the like, comprising:

a pivot post, a first trammel tube, a second trammel tube, means for mounting said first trammel tube for radial movement with respect to said pivot post, means for retaining said first trammel tube in any one of a plurality of radial positions with respect to said pivot post, means for mounting said second trammel tube for radial telescoping movement with respect to said first trammel tube, means for maintaining said second trammel tube in any one of a plurality of telescopic positions with respect to said first trammel tube, a first cutter wheel mounted on said first trammel tube on a portion thereof remote from said pivot post, a second cutter wheel mounted on said second trammel tube on a portion thereof remote from said first trammel tube, and means for mounting said second cutter wheel so that it is movable from a first position wherein it is latched in line with said first and second trammel tubes and may make cuts in insulation sheet material or the like extending radially from said pivot post, to a second position wherein it is disposed at 90° with respect to said first position and may make cuts in insulation sheet material or the like that are arcuate, said means for mounting said second cutter wheel including a rod member associated with said second trammel tube, a handle extending upwardly from the top portion of said rod member, and cooperating detent means operatively associated with said rod member and said second trammel tube for providing latching of said second cutter wheel in either said first or said second position thereof, and means providing for vertical movement of said second cutter wheel with respect to said second trammel tube so that said second cutter wheel may be lifted generally out of contact with insulation sheet material or the like to be cut during movement of said cutter wheel from the first position thereof to the second position thereof.

2. Apparatus as recited in claim 1 further comprising means for mounting said first cutter wheel so that it is movable from a first position wherein it is latched in line with said first and second trammel tubes and may make cuts in insulation sheet material or the like extending radially from said pivot post, to a second position wherein it is disposed at 90° with respect to said first position and may make cuts in insulation sheet material or the like that are arcuate, having their center generally at said pivot post.

3. Apparatus as recited in claim 1 wherein said vertical movement allowing means includes bushings in said second trammel tube through which said rod member is slidable, and wherein spring means acting between said second trammel tube and said rod member normally bias said second cutter wheel into engagement with insulation sheet material or the like to be cut.

4. Apparatus as recited in claim 1 wherein said pivot post is mounted in engagement with a sheet of metal having arcuate indicating marks formed thereon, said metal sheet being adapted to be disposed on a table on which cutting is to be performed.

5. Apparatus as recited in claim 1 wherein said means for retaining said first trammel tube in any one of a plurality of radial positions with respect to said pivot post comprises a plurality of openings formed along the length of said first trammel tube, and a spring-biased plunger stationarily mounted with respect to said first trammel tube, said spring-biased plunger for engagement of the openings formed in said first trammel tube.

6. Apparatus as recited in claim 1 wherein said means for retaining said second trammel tube in any one of a plurality of radial positions with respect to said first trammel tube comprises a plurality of openings formed along the length of said second trammel tube, and a spring-biased plunger mounted on said first trammel tube and for engaging said openings in said second trammel tube.

7. Apparatus as recited in claim 1 wherein said means for mounting said first trammel tube is mounted off-center with respect to said pivot post.

* * * * *